Oct. 18, 1938.    N. MANSFIELD ET AL    2,133,899
INSECTICIDE APPLICATOR
Filed Aug. 17, 1936    2 Sheets-Sheet 2
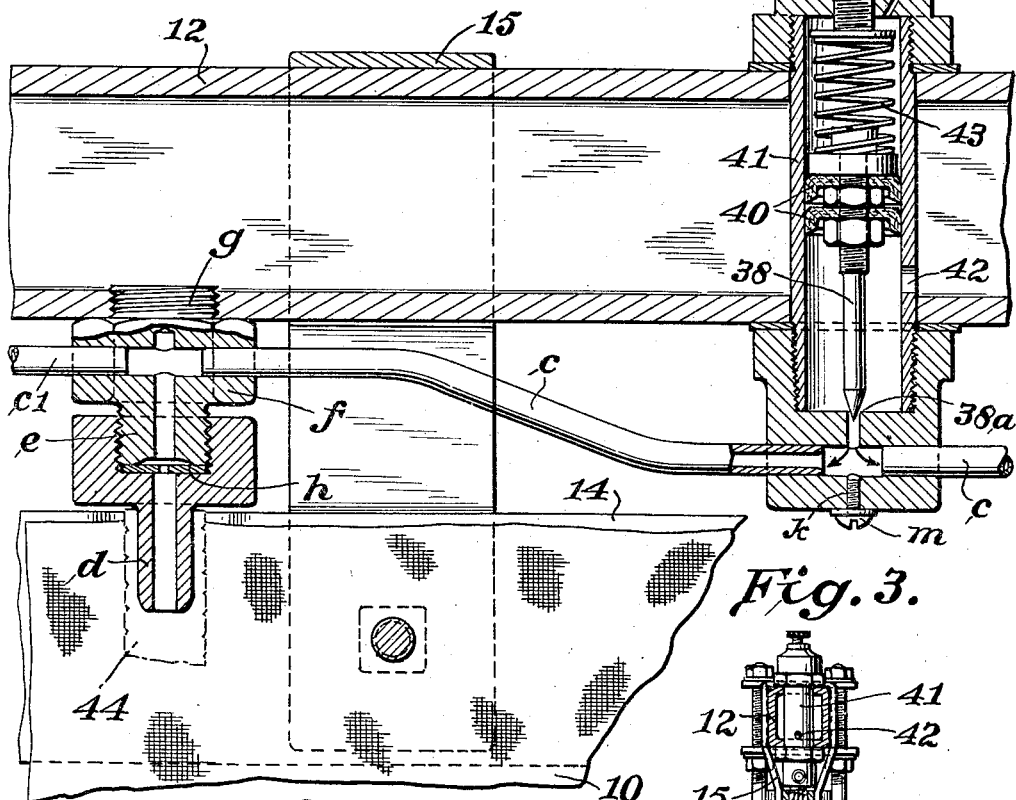
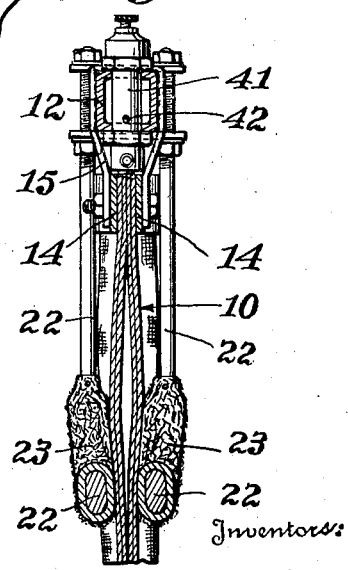
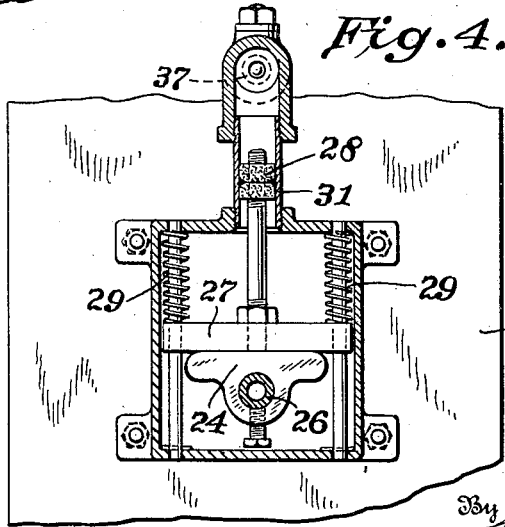

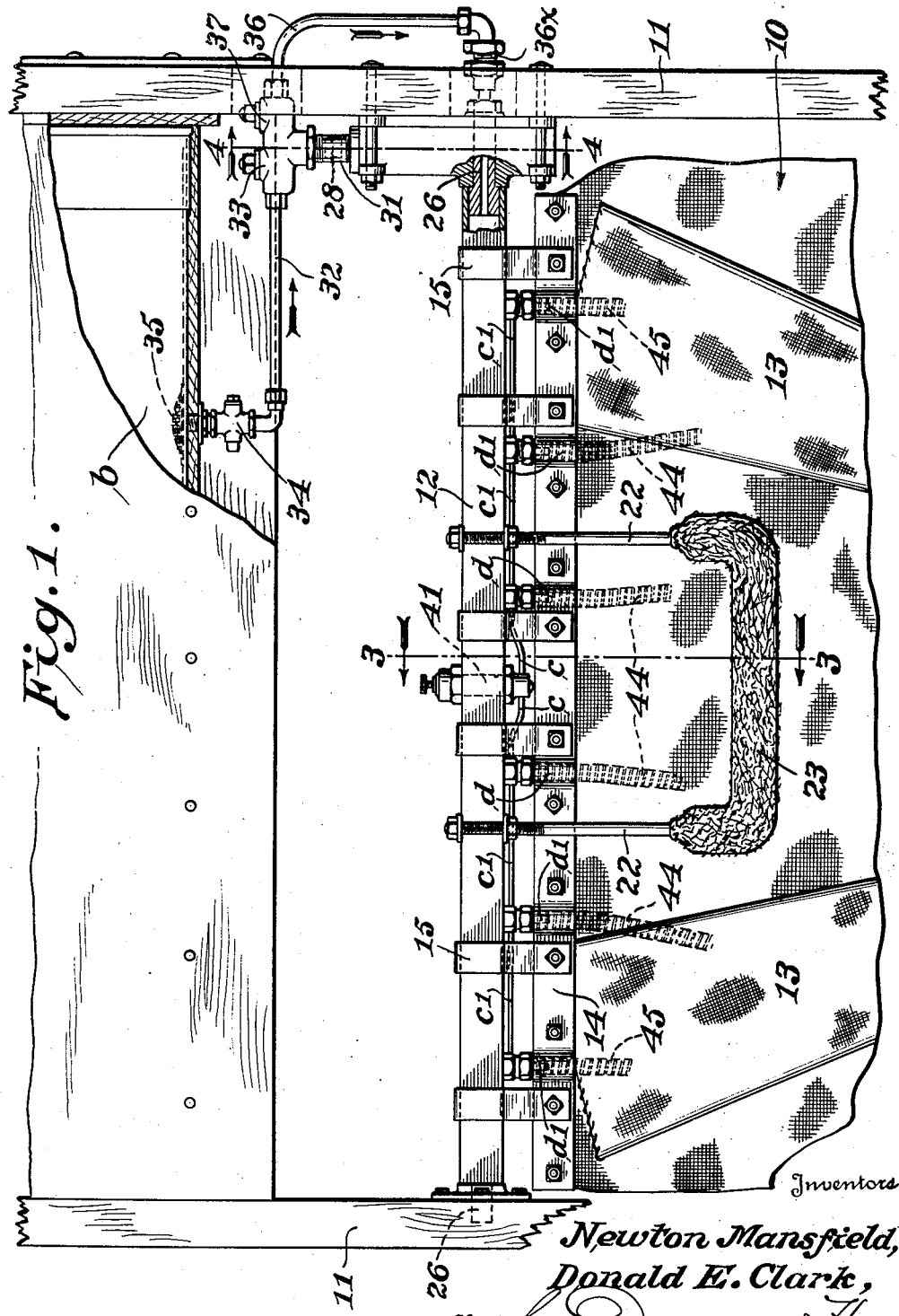

Patented Oct. 18, 1938

2,133,899

UNITED STATES PATENT OFFICE 2,133,899

INSECTICIDE APPLICATOR

Newton Mansfield and Donald E. Clark, Ashland, Ohio

Application August 17, 1936, Serial No. 96,512

1 Claim. (Cl. 119—157)

The invention is an improvement upon that disclosed in an application for Letters Patent of the United States by Newton Mansfield, Serial No. 73,021, filed April 6, 1936, in which means are provided responsive to the movement of the applicator, induced by contact with the passing animal, for supplying the insecticide from a reservoir to the applicator for its distribution upon the animal. Certain features of the apparatus shown but not claimed herein are claimed in said application Serial No. 73,021, filed April 6, 1936.

The invention concerns the features, combination and arrangement of parts hereinafter described and particularly pointed out in the claim.

In the accompanying drawings:

Fig. 1 is a side view of the upper part of the improved apparatus partly in section.

Fig. 2 is an enlarged detail view in section of parts of Fig. 1.

Fig. 3 is a cross sectional view of Fig. 1 substantially on the line 3—3 thereof.

Fig. 4 is a detail view in section of part of the pumping appliance, on line 4—4 of Fig. 1.

The member 10 is employed for applying the insecticide to the animal, and is termed for convenience the applicator. It is preferably made of heavy canvas and is suspended from a tubular member 12, journalled at 26 in the frame 11 so as to turn about its longitudinal axis. The applicator may be of double thickness and is folded so as to provide a vertical plait and with outwardly turned lapels 13.

Bars 14 suspended from the tubular member or rock shaft 12 by hangers 15 clamp the upper part of the blanket or canvas member 10 between them, suitable bolts being used for this purpose.

The tubular member 12 is preferably square in cross section and the hangers 15 are formed to fit this square shape. Arms 22 attached to the hollow member 12 depend at the front and back of the canvas member 10 so that when the animal passing between the uprights 11, 11 by contacting the canvas 10 hanging across the pathway, moves the canvas, said movement will be imparted to the appropriate arm 22, and hence the rock shaft or tube 12 will be turned about its longitudinal axis and thus operate a double acting cam 24 fixed on one of the journals 26, and therefore cross head 27 will be raised and the pump piston 28 will be operated in cylinder 31 to make a delivery of the insecticide from the tubular shaft 12 through our improved distributing system, to the wiping pads carried by the canvas hanging, said pads being substantially the same as in the application referred to. Rotative movement of the shaft or tubular member 12 in either direction will have like effect in delivering a charge of the liquid insecticide through the distributing system to the pads which apply the insecticide to the body of the animal. Springs 29 restore the pump piston to its normal position.

The inlet to the pump cylinder 31 is connected by a pipe 32 through a suitable check valve 33 to a reservoir or supply tank b. A cock 34 and strainer 35 may be applied to this connection. An outlet pipe 36 from the pump has a suitable check valve indicated generally at 37 permitting egress of the insecticide from the pump, but preventing back flow to the pump cylinder 31 from said pipe 36. A suitably packed swivel joint 36x connects the pipe 36 with the tubular member 12 through the journal 26 which is hollow as indicated in Fig. 1, so that the journal despite its rotation serves as part of the conduit for the flow of the insecticide. Check valve 33 permits inlet of the fluid to the pump from the reservoir, but prevents flow of the fluid back to the reservoir.

The tubular member in the present invention has but one outlet. This is controlled by a needle valve 38 carried by a piston 40 within a cylinder 41 carried by the tubular member 12 and sealed therefrom except that a port 42 allows the fluid to pass from the tubular member 12 into said cylinder 41 at a point below the piston and above the seat 38a for the needle valve 38. A spring 43, adjustable by a screw threaded member 40a, stresses the piston downwardly to make the needle valve close the port through its seat, under conditions of rest, but upon a rise of pressure within the tubular member consequent upon the action of the pump 28—31, forcing a fresh charge of the insecticide into the tubular member, the piston 40, of which there is only one in the present improvement, will be forced upwardly and raise the needle valve so that insecticide fluid will now be distributed in proportion to the amount of the new charge through pipes $c$, $c$, to nozzles $d$, adjacent the needle valve and thence through other pipes $c^1$ to other nozzles $d^1$; these nozzles being all alike and located at different points along the underside of the tubular member 12 which supports them. There is no communication between the nozzles and the tubular member 12 except through the pipe system just described and through the needle valve 38 of which as before indicated there is only one, this being located at substantially the lengthwise center of the tubular member.

The several nozzles $d$, $d^1$ are screw threaded upon nipples $e$ of coupling members $f$ which have shanks g screw threaded into the wall of tubular member 12.

These coupling members receive the ends of the pipes c, c¹ and the couplings are provided with suitable passages to allow the fluid to pass to the nozzles from the distributing pipes. These nozzles connect with flexible conduits 44, 45 carried by the flexible blanket or canvas member to convey the fluid to the distributing pads (not shown) mounted on the canvas member at the lower part thereof. The several nozzles and their corresponding couplings are respectively substantially alike in structure and in the size of their ports and in order to get the delivery of an amount of fluid at one point or points different from that delivered to another point or points a disc h is seated between the nipple e and its corresponding nozzle d.

The opening in the disc is of a diameter to determine the amount of fluid which shall be delivered at that particular nozzle, and by using discs having different sizes of apertures relative to each other the flow of fluid to one part of the applicator may be greater or less as may be desired relative to the amount delivered by another nozzle to another part of the flexible hanging of canvas or other material.

The use of these perforated discs will avoid the necessity of having adjustable manually operable valves. If desired uniform delivery may take place at all the nozzles by using discs having perforations of proper size for this purpose. Delivery occurs only when there is a rise of pressure within the tubular member 12 and since this rise of pressure is communicated to the fluid throughout the whole system of conduits and nozzles when the single needle valve lifts there will be a delivery of the fluid at each of the nozzles. When the needle valve closes due to the pressure dropping within the system the flow at all the nozzles will stop.

As to the general characteristics of the apparatus these are the same as in the application above referred to. Among these may be mentioned that the apparatus feeds the fluid to the delivery points on the flexible blanket or canvas only when an animal seeking, for instance water, passes through a narrow passage across which the canvas is hung to be contacted and operated by the passing animal. At other times when no animal is passing or if the animal rests while in contact with the blanket no feed of fluid will take place. Further, the amount of fluid delivered will vary with the size of the animal, a large one moving the blanket to a greater degree than a small animal.

The pumping apparatus is preferably placed at a point at the inner side of one of the uprights 11.

The member 22 which depends from the member 12 to be operated by the movement of the canvas hanging may be covered by a padding 23 of any suitable material to take wear.

An opening k may be formed in the member 38b in line with the needle valve seat 38a and this opening may be closed by a screw threaded plug m.

While we have described what we regard as a practical and economical form of the apparatus it will be understood that we do not limit ourselves to the exact construction disclosed, but variations therein may be made within the scope of the appended claims. Thus, as an instance, the member 12 need not be tubular throughout. One purpose of its chambered formation is to receive the fluid forced by the pump and make said fluid act on the needle valve mounted in the chambered part, but so far as the mounting of the nozzles is concerned it is immaterial whether or not the member is chambered because all of these nozzles are controlled from the one valve.

The apparatus takes care of varying degrees of delivery in respect to differences in the intervals of time between operations and different demands consequent upon the difference in the sizes of the animals treated, or the variations due to the difference in size between different parts of the same animal. It also takes care of variations in the movement of the animal or animals past the blanket, so that waste is eliminated by varying the supply of insecticide according to the demand. The position of rest of the apparatus may be that when the blanket is hanging vertically, or it may be any position of the rocking member 12 at which the main valve 38 is closed due to a lowering of pressure in the system resulting from the discharge of fluid into the blanket.

If the blanket be moved from the vertical position of rest the valve opens and causes a discharge of the liquid, but the valve closes automatically when the liquid is discharged, no matter whether the blanket is hanging vertically or not.

An animal places its head and neck under the blanket and moves forward about a foot. This will cause the rotating member 12 to move through an angle of about 15°. This movement will cause the needle valve 38 to open and discharge only about one third of a dose, as a movement of 15° of the rotating tubular member caused the piston to move up only about one third of its travel. The valve then closes as the pressure in the tubular member has been relieved. The animal has thus supplied to the wiping member only what it took out to apply the proper dose to its neck and shoulders. It should be borne in mind that the animal is now standing at rest under the blanket and the rotating tubular member has rotated to a position about 15°, also the piston in the pump has moved up in the pump about one third of the way and has come to rest.

After standing with neck and shoulders under the blanket for a period of time, the needle valve being closed, and only about one third of the required dose having been discharged by the pump the animal again moves forward and passes out from under the blanket. This forward movement of the animal causes the rotating tubular member to be further rotated to its extreme angle, viz. 45°—or 30° more than when the animal was standing with neck and shoulders under the blanket. Now this increased angular motion of the rotating tubular member causes the piston in the pump to move up the balance of its stroke. This causes an increased pressure in the tubular member and the needle valve again opens and discharges the remaining two thirds of the dose to the wiping pads which have been moved by the after part of the animal's body in passing out from under the blanket.

We claim:

In combination, an applicator member mounted to be moved by a passing animal, a rockable member operated by the movement of the applicator, said rockable member having a chamber associated therewith, a reservoir for insecticide fluid in communication with said chamber, a pump operated by the rocking member for delivering liquid from said reservoir to said chamber, a valve automatically delivering liquid from said chamber, and a distributing system delivering fluid to the applicator member comprising conduits extending from different points along said rocking member, and conduit means extending from and controlled by said valve and supported by said rocking member to deliver liquid from said chamber to said distributing conduits, substantially as described.

NEWTON MANSFIELD.
DONALD E. CLARK.